United States Patent [19]

Reed et al.

[11] 4,264,235

[45] Apr. 28, 1981

[54] METHOD AND APPARATUS FOR SECURING AND RELEASING A FLEXIBLE LINE IN A PRE-EXISTING CHANNEL

[75] Inventors: Donald C. Reed, Humble; Charles E. Rinehart, Jr., Houston, both of Tex.

[73] Assignee: Exxon Production Research Company, Houston, Tex.

[21] Appl. No.: 30,265

[22] Filed: Apr. 16, 1979

[51] Int. Cl.³ .......................... F16L 1/00; E05D 1/06
[52] U.S. Cl. ................................ 405/169; 405/164; 405/154
[58] Field of Search ...................... 405/154–172, 405/174

[56] References Cited

U.S. PATENT DOCUMENTS

| | | | |
|---|---|---|---|
| 2,119,996 | 6/1938 | Massholder | 292/37 |
| 3,201,948 | 8/1965 | Schramm | 405/174 |
| 3,226,728 | 12/1965 | Walvoord | 405/169 X |
| 3,323,313 | 6/1967 | Owens | 405/174 |
| 3,434,296 | 3/1969 | Otteman et al. | 405/168 |
| 3,503,218 | 3/1970 | Broadway et al. | 405/169 |
| 3,557,564 | 1/1971 | Hauber | 405/169 |
| 3,572,408 | 3/1971 | Hnot | 141/387 |
| 3,595,312 | 7/1971 | Matthews | 405/169 |
| 3,606,397 | 9/1971 | Flory | 285/190 |
| 3,614,869 | 10/1971 | Flory et al. | 405/169 |
| 3,641,602 | 2/1972 | Flory et al. | 9/8 P |
| 3,702,539 | 11/1972 | Matthews | 405/169 |
| 3,708,811 | 1/1973 | Flory | 9/8 P |
| 3,739,592 | 6/1973 | Plake | 405/169 |

Primary Examiner—Dennis L. Taylor
Attorney, Agent, or Firm—Marc L. Delflache

[57] ABSTRACT

A method and apparatus for securing and releasing an underwater flexible line (30) within a channel (20) is disclosed. The channel (20) is formed on the support member (22) of an offshore structure such as the leg of a fixed offshore platform of the tension member of an offshore riser buoy system. The apparatus comprises a sled (22) which advances relative to the channel (20) on a track system. The sled (32) includes an aligning system for orienting and seating the line within the channel (20) as it advances along the length of the structure. Initially, the line is attached to the upper end of the offshore structure, preferably at or above the water surface and allowed to hang freely to the sea bed. Thus, the line is adjacent the channel and readily available for proper aligning and seating within the base of the channel. After the sled aligns and seats the line within the channel, it closes the channel securing the line by means of latches (34) pivotally mounted to one side of the channel. The sled may be advanced along the length of the channel by means of a tow line (50) which is also used to recover the sled once the line has been secured within the channel, or the sled may be advanced by means of gravity.

19 Claims, 35 Drawing Figures

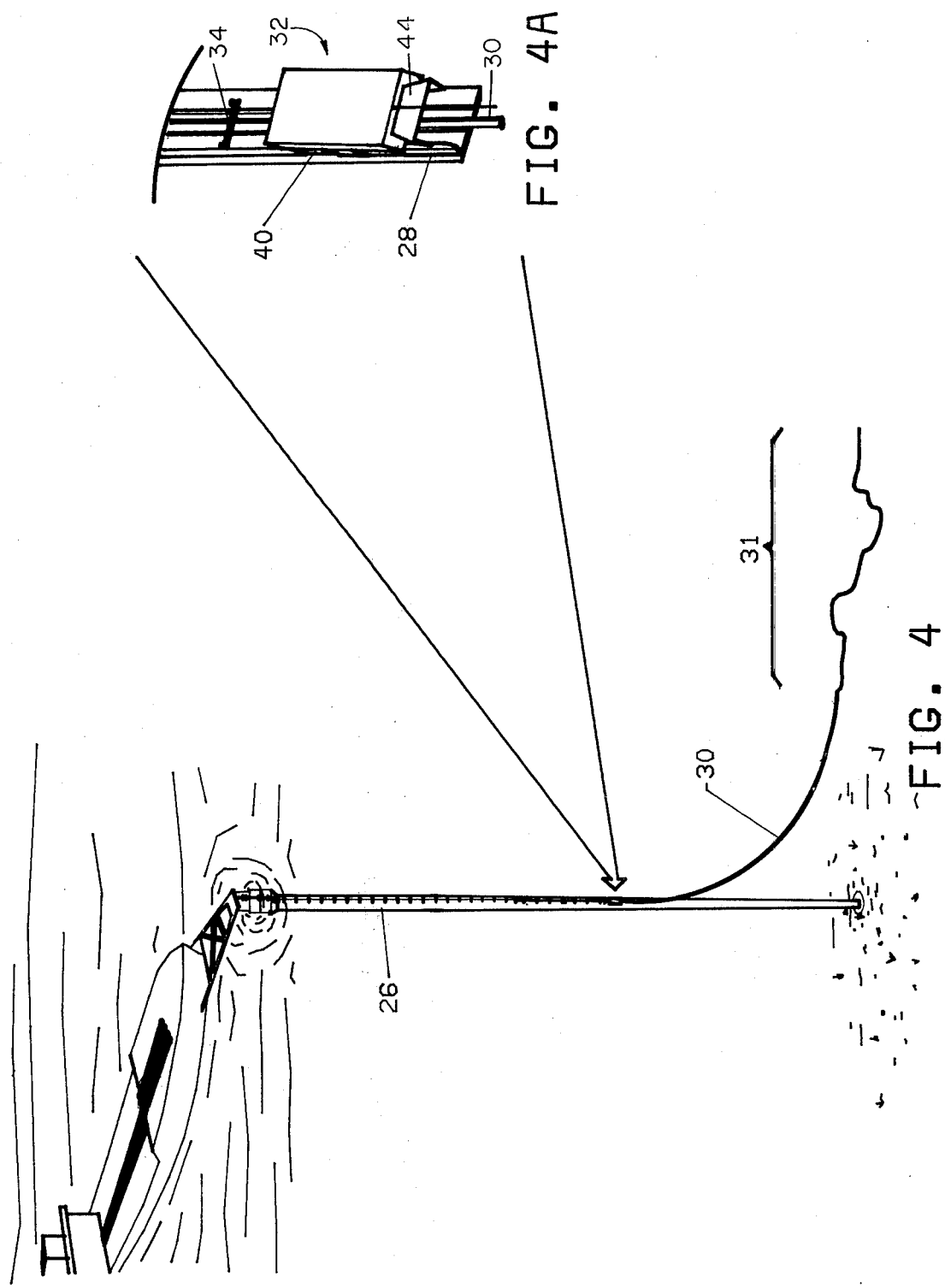

METHOD AND APPARATUS FOR SECURING AND RELEASING A FLEXIBLE LINE IN A PRE-EXISTING CHANNEL

BACKGROUND OF THE INVENTION

1. Field of the Invention

This invention relates to an apparatus and method for securing a flexible line on an elongated structure and, more particularly, relates to securing a flexible line, such as a flexible flow-line or an electromechanical cable, in a pre-existing channel region on a support member of an offshore structure.

2. Description of the Prior Art

Within the last few years offshore petroleum activity has been increasing at a significant rate worldwide. This in turn has prompted the development of more sophisticated offshore structures for the exploration and production of oil and gas. In addition, the world demand for oil and gas has necessitated improvements in the manner of installing facilities for the transportation of oil and gas from the offshore structure to an onshore refining facility. Traditionally, oil and gas are transported by means of an underwater pipeline running from the offshore structure to the onshore facility or, alternatively, from the offshore structure to an adjacent offshore storage facility adapted to accommodate ocean-going tankers. The underwater pipeline is attached in its vertical attitude to a support member of an offshore structure, e.g., the leg of a platform or the tension member of a mooring buoy system such as that disclosed by Hauber, U.S. Pat. No. 3,557,564, and Broadway et al, U.S. Pat. No. 3,503,218. The flow lines which are attached to structures located in deeper water are preferably flexible since these structures, due to their generally slender geometry, undergo large lateral deflections in response to wave loadings and related environmental forces. In addition, mooring buoy systems such as that disclosed by Flory et al, U.S. Pat. No. 3,641,602, and Flory et al U.S. Pat. No. 3,614,869 often include a swivel assembly along the length of the tension member. This requires a flow line resilient enough to pass around a universal joint of the tension member permitting pivotal movement of the joint without damaging the flow line or interferring with the flow characteristics of the line.

Besides flow lines, offshore platforms frequently obtain their electrical power from onshore rather than generating it with equipment on-board the production platform. The power can be transmitted via a cable directly from the shoreline, or, if the production platform is tied to an offshore storage facility, the power generating equipment can be mounted on the offshore storage facility thereby transmitting electrical power directly from the offshore storage facility to the platfrom. However, the same problems associated with flexible flow lines occur with respect to electrical cables. For example, if the electrical generating power equipment is housed onboard an offshore storage facility which is moored to the sea floor by a single leg riser system, the cable must be sufficiently flexible to pass around the universal joint of the tension member and, subsequently, attach to the leg of the offshore platform without damaging the inner core of the cable.

Frequently, the electrical cable or flow line is installed on an offshore platform via a J-tube assembly as disclosed by Otteman et al, U.S. Pat. No. 3,434,296, or via a riser assembly as disclosed by Matthews, U.S. Pat. No. 3,702,539.

With respect to a single anchor leg mooring (SALM) 16 system as illustrated in FIG. 1, the preferred practice is to suspend an electrical cable 15 from the top end of a support member 26 near the water surface to a second submerged buoy 18 at a predetermined distance from the SALM (i.e., 1000-2000 yards). The second buoy supports the cable at a predetermined depth approximately midspan between the support member and the sea floor. The buoy in FIG. 1 is restrained by a set of anchor cables 19. In this manner, unloading tankers may berth adjacent the SALM without interferring with the second buoy support. In deeper water, the second buoy 18 is restrained a predetermined depth below the water surface by the submerged weight of the cable 15 as illustrated in FIG. 2.

Occasionally, the flow lines of a SALM unit are not suspended as illustrated in FIGS. 1 and 2 but, rather, are attached as illustrated in Flory et al, patents '602 and '869, to a tension member. The flow line may be an integral part of the tension member of the SALM, i.e. passing within the tension member, or attached by means of clamps, such as that illustrated in Hauber, to the exterior surface of the tension member.

However, several problems have been encountered with the conventional methods for securing electromechanical cables and flow lines on both fixed offshore production platforms and SALM systems. The J-tube assembly requires a vertical hook load to pull the cable or line through the assembly due to the frictional forces between the line and J-tube. If the hook load is lost, the cable will slip back into the J-tube coiling itself within the tube. The second buoy system, illustrated in FIG. 2, is particularly vulnerable to environmental load problems. The wave and current loads on a line suspended over several thousand feet are substantial. Typically, the line is not laterally restrained; but rather, the line is permitted to wander freely with respect to the SALM terminal. This poses a problem for tankers attempting to approach the SALM terminal and dock. Therefore, industry has suggested the need for an improved method and apparatus to install and maintain flexible flow line and electromechanical cables adjacent fixed offshore platforms and SALM terminals.

Additional patents of general interest are:
U.S. Pat. No. 2,119,996—Massholder
U.S. Pat. No. 3,572,408—Hnot
U.S. Pat. No. 3,595,312—Matthews, Jr.
U.S. Pat. No. 3,606,397—Flory
U.S. Pat. No. 3,708,811—Flory

SUMMARY OF THE INVENTION

Recognizing the problems associated with the existing methods, the present invention is a method and apparatus for securing a flexible line on an elongated structure; more particularly, the present invention is a method and apparatus for installing a flexible line within a channel region formed on an elongated structure such as a support member of an offshore structure. In this manner, the present invention avoids the long installation periods associated with J-tubes and marine risers in addition to the lateral load problems associated with a freely suspended cable or flow line.

The invention comprises an opening means for preparing the channel region to receive a flexible line. The invention is not limited to the installation of a single line but may actually be used to install several lines simultaneously or sequentially. The invention also includes an alignment guide for directing the line into the channel and properly seating it therein and a retaining or closing means to secure the line within the channel once it has been installed by the alignment guide system.

In a preferred embodiment, the retaining or closing means comprises a plurality of latches pivotally attached to the support member of the structure adjacent the channel. Each latch comprises an elongated member which is pivoted between a first position wherein the member transverses the channel and a second position wherein the member is aligned coaxially with the channel.

The apparatus includes a sled which is displaceable along the length of the channel. The sled includes an external housing and a first or opening means which is mounted to the housing adjacent a first or front end of the housing. The alignment guide is supported from the housing adjacent the opening means. A second means is supported from the housing opposite the opening means at a second or rear end of the housing for contacting the closing means thereby securing the line. The sled is advanced along the channel via a tow line; however, in a modification of the invention, the sled is advanced by means of gravity since the apparatus is typically going to be lowered toward the sea floor.

The method involves initially attaching the flexible line to an offshore structure near its upper end, preferably above the water surface, so that the line hangs adjacent to the channel. The sled is then advanced along the channel, opening the channel, and aligning the line above the channel. The line is lowered into the channel by the alignment guide and secured within the channel by the second means and the closing means.

The sled is retrieved after it has advanced to the end of the channel securing the line to the support member along the entire length of the channel.

The line is released from the channel by substantially the same procedure in reverse. The sled is advanced upward toward the surface by means of a retrieval line or the like. In this reverse direction, the second means performs as an opener releasing the line from its secured position thereby permitting the line to be retrieved from the channel.

Examples of the more important features of this invention have been summarized rather broadly in order that the detailed description which follows may be better understood, and in order that the contribution to the art may be better appreciated. There are, of course, additional features of the invention which will be described hereinafter and which will also form the subject of the claims appended hereto.

A BRIEF DESCRIPTION OF THE DRAWINGS

FIG. 4 is a perspective view of an SALM terminal wherein a flexible cable is being secured to the tension member.

FIG. 4A is a perspective view of the present invention in a vertical attitude descending down the tension member.

DETAIL DESCRIPTION OF THE INVENTION

Figure 1:
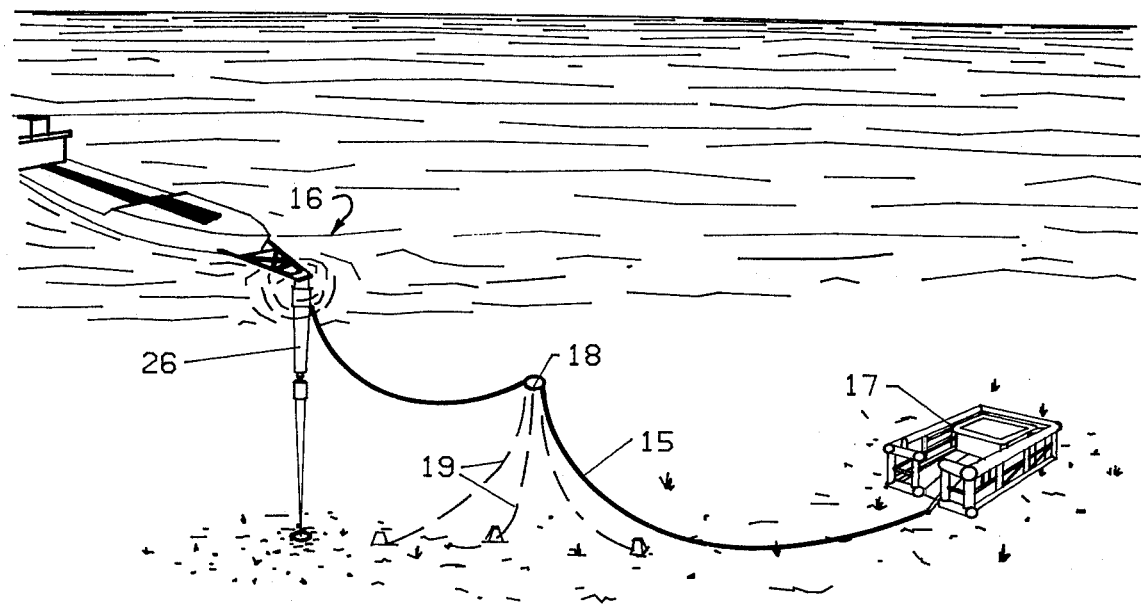
FIG. 1 illustrates a catenary method for supporting a flexible line wherein the flexible line is suspended from an SALM terminal to the sea floor. The cable is, however, supported at approximately midspan by a second buoy which is restrained by a series of anchor lines to the sea floor.
Figure 2:
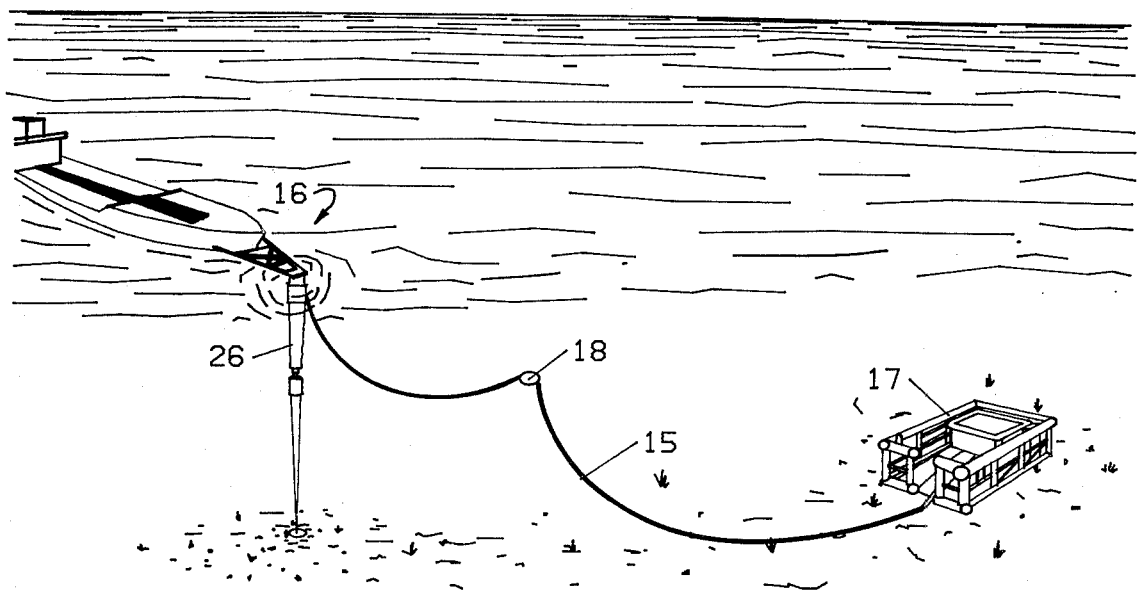
FIG. 2 is similar to the catenary method illustrated in FIG. 1 with the exception that the second buoy is restrained at a predetermined depth below the water surface by the submerged weight of the line.
Figures 3, 3A:
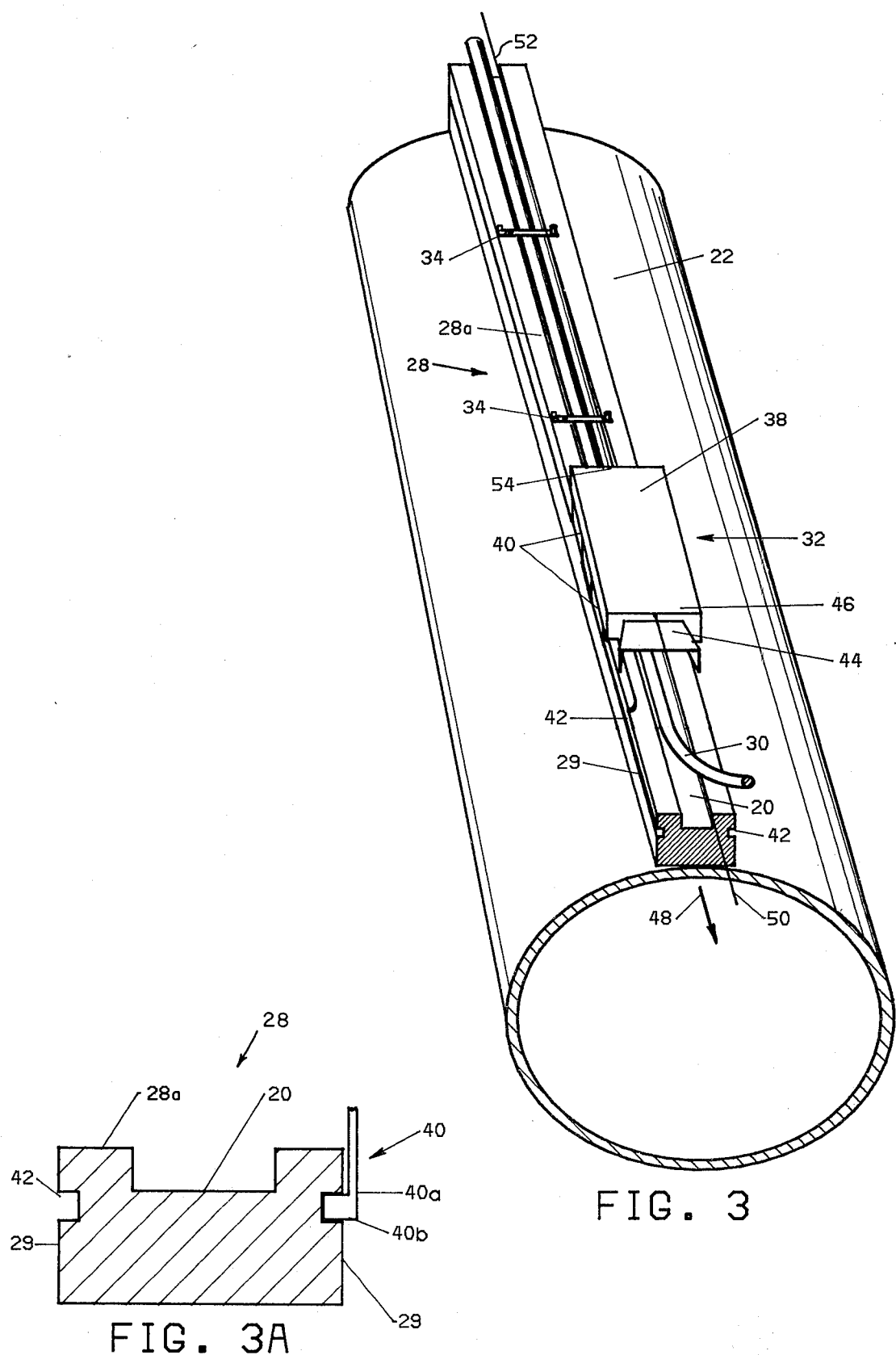
FIG. 3 is a perspective view of the present invention supported above a pre-existing channel formed in a support member of an offshore structure.
FIG. 3A is a cross-sectional view of the channel illustrating a detail view of the preferred track means used to guide the sled.

In response to the need for an improved method and apparatus to install or maintain a flexible flow line or electromechanical cable adjacent a support member of a fixed offshore platform or a SALM terminal, one embodiment of the present invention is generally illustrated in FIG. 3.

Referring to FIG. 3, a channel region 20 (hereafter referred to as channel) is formed on an outward surface 28a of an elongated member 28 which spans along the entire length of an elongated structure 22 such as a support member of an offshore structure. As noted earlier, the support member of the structure may be a leg 24 of a fixed platform (see FIG. 5B) or, with respect to a SALM terminal, a central tension member 26 (see FIG. 4) extending from the water surface to the sea floor. It is within channel 20 that a flexible flow line or electromechanical cable 30 (hereinafter referred to as the "flexible line") is placed. The present invention includes a sled 32 which straddles the channel and is used to initially align the flexible line 30 over the channel. The present invention also includes a series of latches 34 pivotally connected along the length of the elongated member 28. The flexible line is secured within the channel by means of the latches 34 pivotally rotating across the width of the channel. Typically, for a flexible line three to six inches in diameter, the latches are spaced approximately ten to fifty feet apart. Each latch 34 comprises a bar member 36 (see FIG. 6) which is pivoted between a first position, wherein the bar 36 transverses the channel as shown, and a second position wherein the bar 36 is aligned coaxially with the channel.

The sled 32 includes a housing 38 and track means 40. The housing 38 is supported a predetermined distance above the channel by the track means 40. The elongated member 28 includes a groove 42 along each side 29. As illustrated in FIG. 3A, the track means 40 typically comprises a vertical plate 40a which attaches to the side (not shown) of the housing. The track means also includes a second plate 40b mounted to the plate 40a at right angles. The plate 40b is sized to fit inside groove 42 thereby preventing the lateral movement of the sled with respect to the channel.

The housing includes an alignment guide having a funnel 44 attached at a first end 46 of the sled. The sled 40 is advanced along the channel in the direction of the arrow 48 by means of a tow line 50. Alternatively, the sled may advance by gravitational force alone since the sled is typically going to be lowered from the water surface toward the sea floor along the elongated member. A retrieving line 52 is attached to a second end 54 of the sled in order to recover the sled once the flexible line has been secured within the channel along the entire length of the support member.

FIG. 4 is a perspective view of a SALM terminal illustrating the operational attachment of the flexible line 30 to the lower half of the tension member 26. As illustrated in FIG. 4, the sled 32 has advanced approximately two-thirds of the way down the tension member.

As shown in FIG. 4A, the flexible line is suspended adjacent the channel approximately in front of the sled 32 to effect the proper alignment and installation of the line within the channel. A predetermined amount of spare line 31 rests on the sea floor to accommodate the intake of the line within the channel as the sled advances.

Figure 5A:
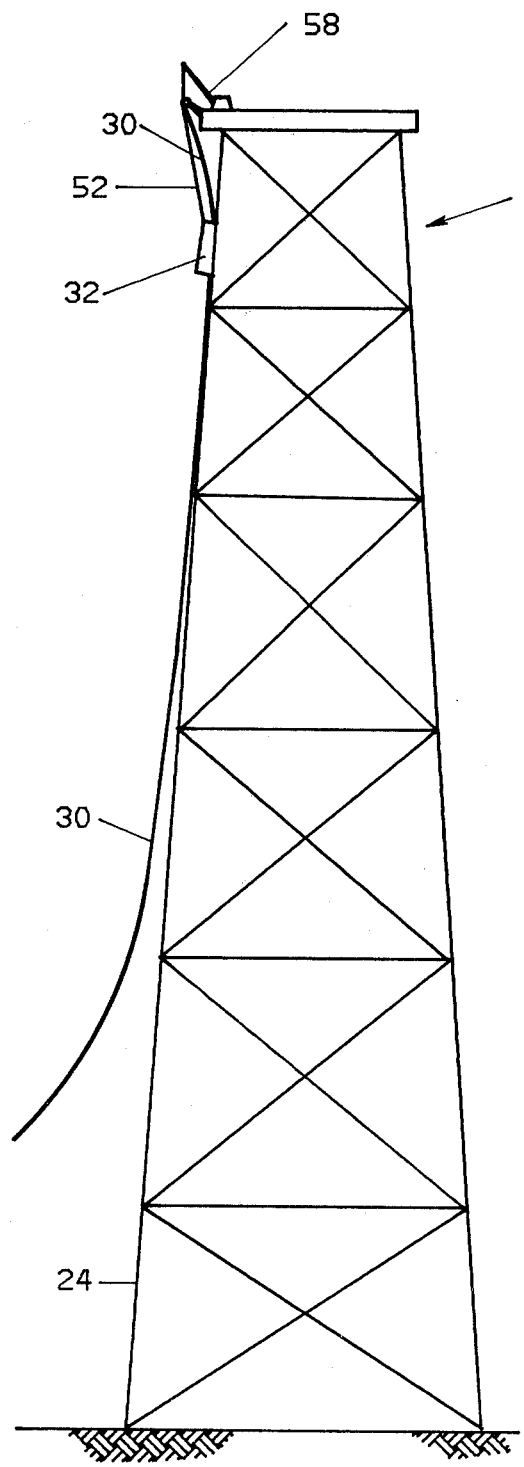
FIGS. 5A and 5B are elevation views of a fixed offshore structure having a support member wherein a flexible line is suspended adjacent the support member illustrating, in FIG. 5A, the initial orientation of the line with respect to the structure and, in FIG. 5B, the advancement of the present invention downward along the length of the support member.
Figure 5B:
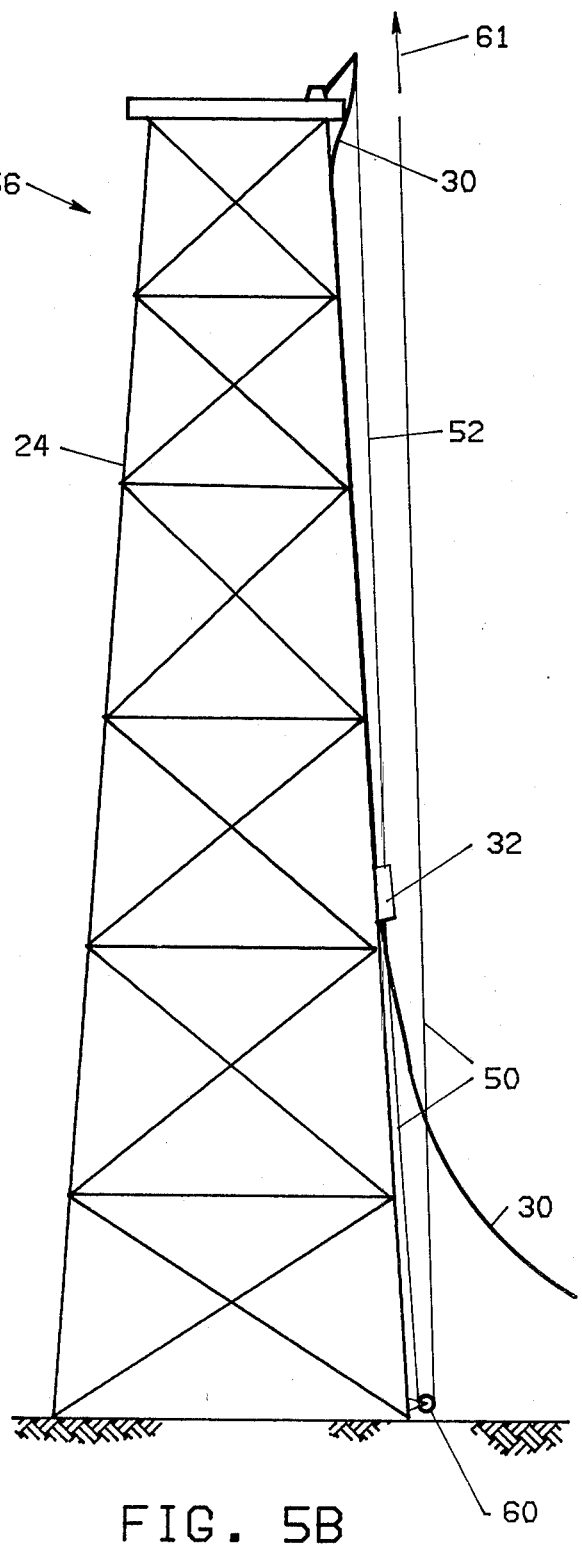

FIGS. 5A and 5B illustrate the installation of the flexible line 30 on a support member 24 of a fixed offshore platform 56. The flexible line 30 is initially suspended from the upper end of the platform by a crane 58 or the like. The sled 32 is then placed over the line 30 and attached to the track means on the support leg 24. The sled is initially restrained in position by a retrieval line 52 which attaches to another sheave of the crane 58 or the like. The tension on the retrieval line, is then released permitting the sled to descend down the support member under its own weight or by means of tension on the tow line 50. As shown in FIG. 5B, a pulley 60 could be attached at the lower end of the platform near the sea floor. The tow line 50 would loop around the pulley and return to the water surface. In this manner, the sled is advanced by pulling on the tow line 50 in the direction indicated by the arrow 61. Once the sled runs off the track means at the lower end of the platform, it is recovered by either the tow line or the retrieval line.

Figure 6:
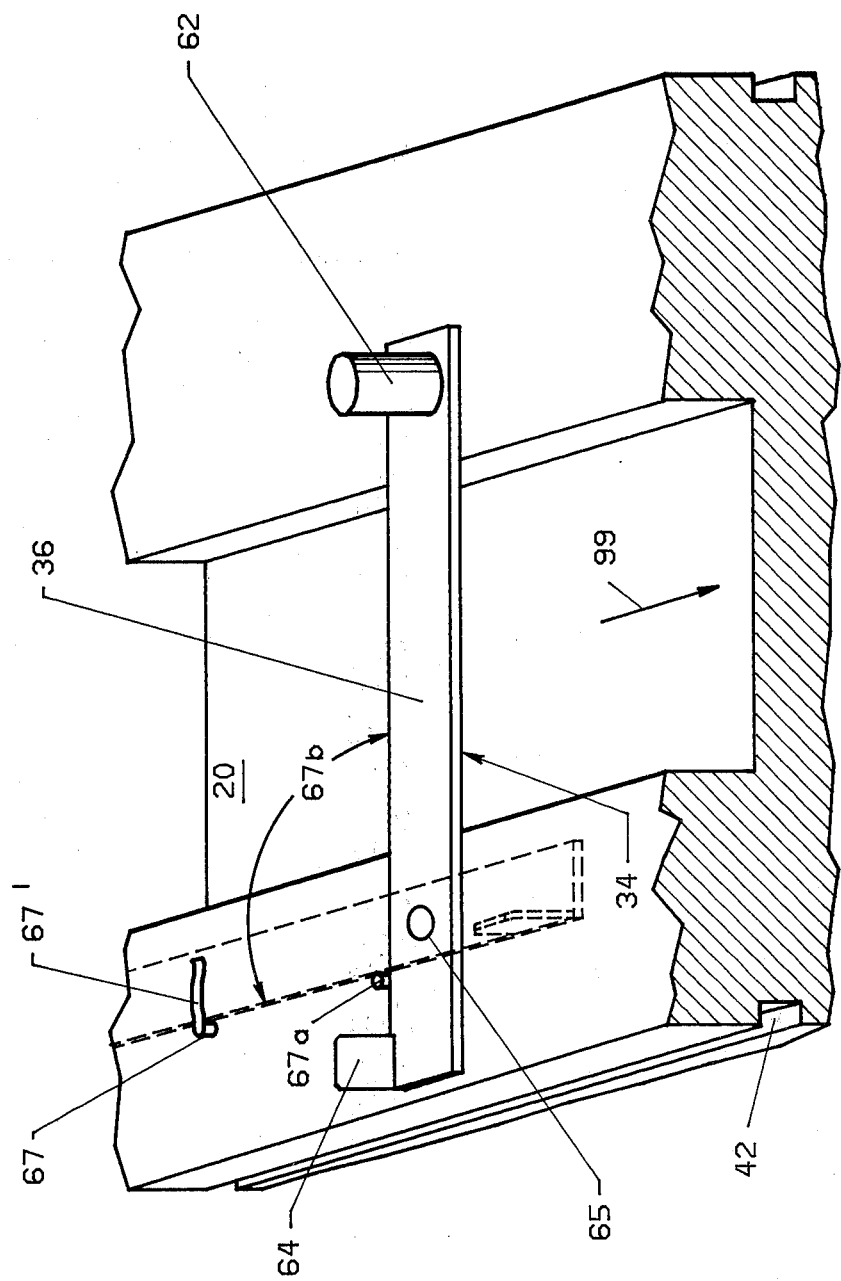
FIG. 6 is a detail view of the latch used to secure the line within the channel.

FIG. 6 is a detailed view of the latch 34 used to secure the flexible line within the channel once the sled has advanced past the latch. As discussed below in greater detail, the sled is used to operably rotate the latch from an open to a closed position thereby securing a flexible line within the channel. Each latch comprises a bar member 36 having a closure post 62 and an opener post 64. The latch is pivoted on a pin 65 immediately adjacent the channel. The latch is pivotable between a first or closed position, wherein the bar transverses the channel, illustrated by the solid lines in FIG. 6, and a second or open position wherein the bar is aligned coaxially with the channel, illustrated by the dashed lines in FIG. 6, thereby permitting the placement of the flexible line within the channel by the sled. The opener post 64 is shorter than the closure post 62 and is closer to the pin 65 then the closure post. The reason for this will be apparent when the operational aspect of the sled is discussed below. A stopper 67 is mounted on elongated member 28 so as to prevent rotational movement of the latch 34 past the second position. A leaf spring 67' may be attached to the stopper 67 to prevent the latch from falling back to the first position due to gravity since the sea floor is in the direction indicated by the arrow 99. Another stopper 67a is also mounted on the elongated member 28 so as to prevent excessive clockwise rotation of the bar member 36. In this manner, the latch is susceptible to rotational movement within a 90° quadrant 67b.

Figure 7A:
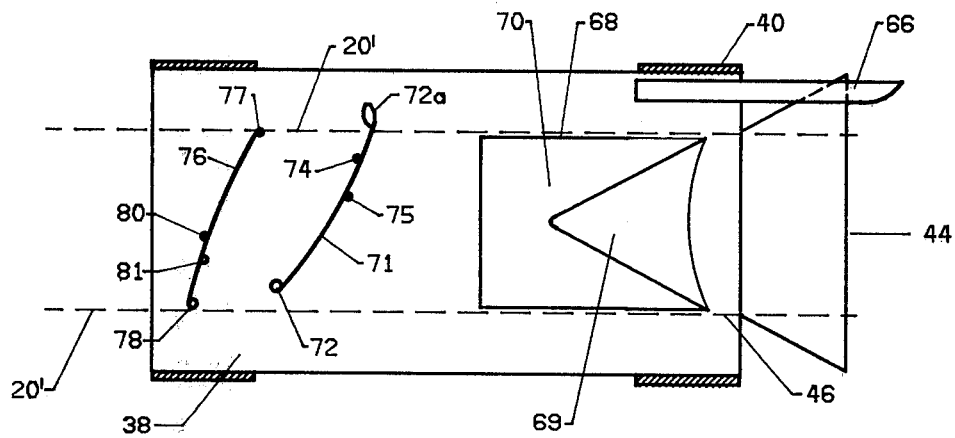
FIGS. 7A and 7B are bottom plan and elevation views of the sled, respectively.
Figure 7B:
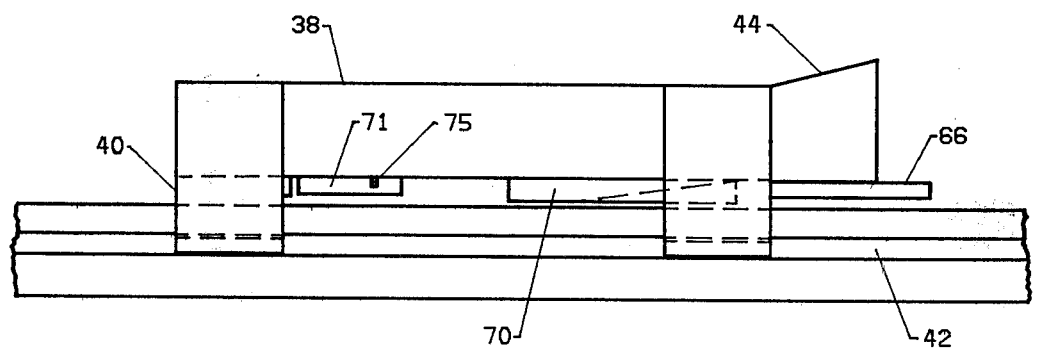

As illustrated in FIGS. 7A and 7B, the sled includes a housing 38 having an opening means 66 attached to the bottom side of the housing at the first or front end 46. The opening means 66 is preferably an elongated member having a curved side surface to assist in rotating the latch 34 upon contact with the opener post 64. The alignment guide includes the funnel 44 and a ramp 68 having a V-shaped groove 69 to assist in orienting the line within the channel. The alignment guide also includes a flat spacing member 70 to seat and hold the line at the base of the channel during the locking or securing operation. Preferably, the ramp 68 and spacing member 70 are an integral unit providing continuous contact with the line as it is positioned within the channel.

The sled includes a first spring 71 secured at one end 72 to the bottom of the housing and restrained from rotating in a counterclockwise direction about end 72 by a first stop 74. The first spring is also restrained from rotational movement about its secured end 72 in a clockwise direction by a second stop 75. The free end 72a of the first spring extends past the edge of the channel, as indicated by the dashed lines 20'. The significance of this extension is discussed below with reference to the operation of the present invention. The sled includes a second spring 76 also attached to the bottom side of the sled immediately behind the first spring. The second spring 76 is also secured at one end 77 to the bottom of the housing on the opposite side from the first spring. However, unlike the first spring, the free end 78 of the second spring extends only slightly past the wall of the channel. The second spring also includes a first and second stop pin 80, 81 to prevent its rotational movement about its secured end 77.

Figure 8A:
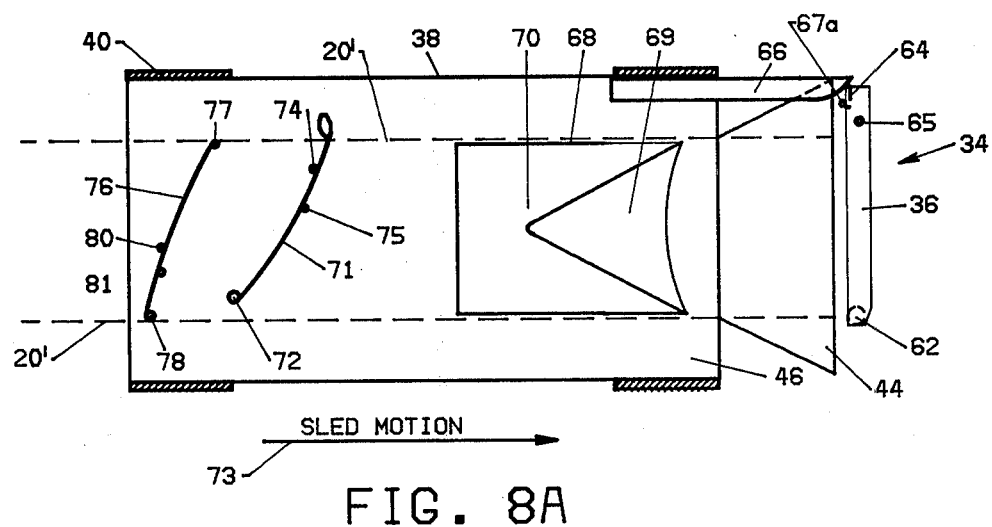
FIGS. 8A-8F are bottom plan views of the sled, looking upward toward the top of the sled, illustrating an opening sequence wherein the sled is moving to the right as indicated by the arrow such that each latch, initially in a closed position transversing the channel, is pivoted to an open position permitting an alignment guide to orient and seat the flexible line within the channel.
Figure 8B:
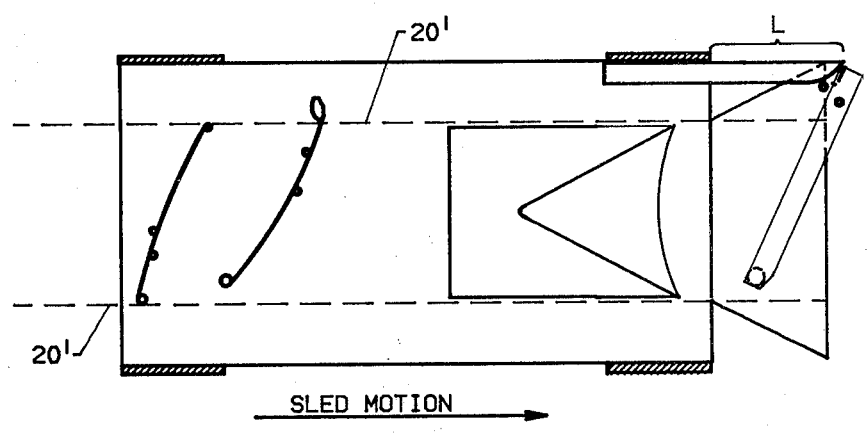
Figure 8C:
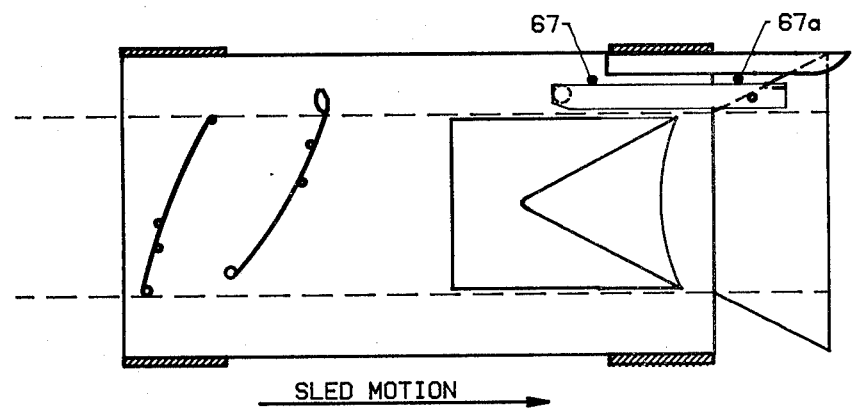
Figure 8D:
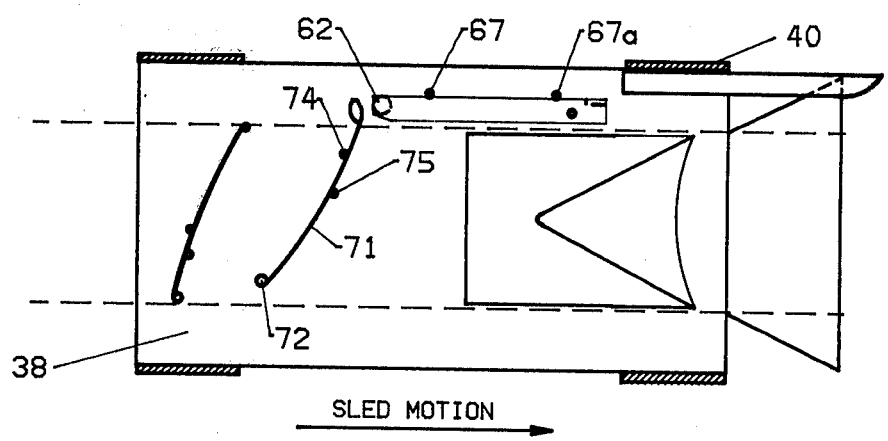
Figure 8E:
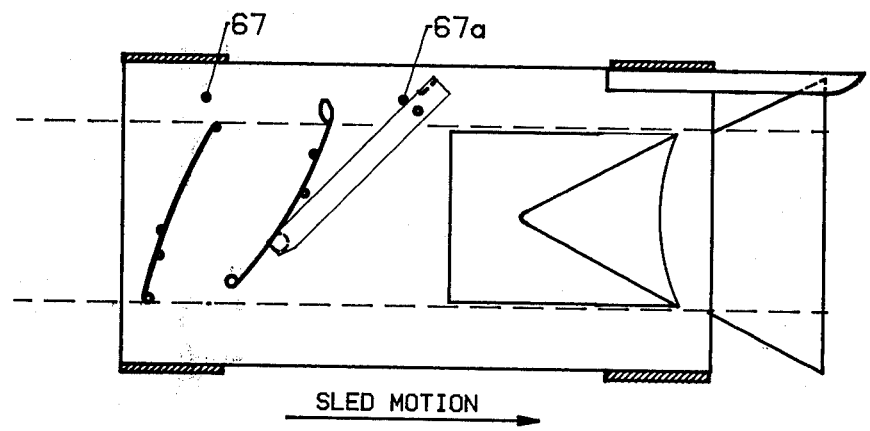
Figure 8F:
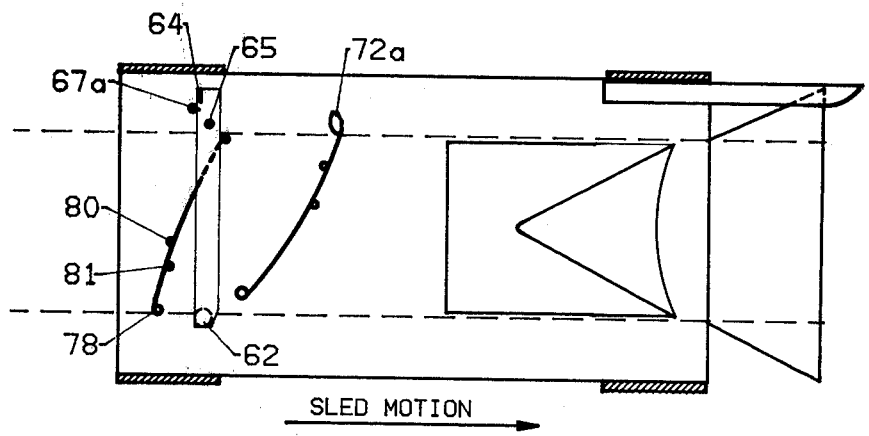

With reference to FIGS. 8A-8F, the installation of the flexible line within the channel is illustrated by a series of sequential bottom plan views of the sled. Referring to FIG. 8A, the sled is moving in a direction as indicated by the arrow 73 toward the latch 34. Initially, the opening means 66 strikes the opener post 64 beginning the pivotal movement of the latch about the pin 65. Eventually, the latch pivots approximately 90° (FIG. 8C) contacting stopper 67 thereby preventing further contact of the opener post 64 with the opening means 66. Thus, the latch has rotated from the first position to the second position. The length "L" of the opening means extends past the first end 46 of the housing. The end curvature of the opening means 66 is selected to ensure that upon pivotal movement of the latch the closure post 62, which extends into the paper as seen in FIG. 8B, clears the ramp 68. As the sled advances forward, the flexible line (not shown) is oriented with respect to the channel by the V-shaped groove 69 and seated at the base of the channel by the spacing member 70. By the time the closure post 62 strikes the free end 72a of the first spring 71 (FIG. 8D) the flexible line is restrained at the base of the channel by the spacing member 70. As the closure post strikes the first spring 71, the first stop 74 prevents the rotational movement of the first spring in a counterclockwise direction about the secured end 72. In this manner, the closure post follows the contour of the first spring as the sled advances (FIG. 8E). The second stop 75 is short enough to permit the closure post to pass over yet long enough to contact the upper edge of the first spring 71 and restrain rotational movement of the first spring. Once the closure post slides past the secured end 72 of the first spring, the latch has rotated back to the first position transversing the channel and securing the cable therein. As the sled further advances with the latch in the first position, the closure post 62 strikes the free end 78 of the second spring 76. However, the latch is prevented from rotating back in a counterclockwise direction as seen in FIG. 8F due to the stopper 67a. In this manner, the free end 78 of the second spring 76 is merely plucked. The second spring 76 is prevented from rotational movement in a clockwise direction due to stopper 80.

The distance from the opener post to the closure post is a function of the channel width. The wider the channel, the greater the distance. It is important that once the latch transverses the channel, the opener post is not further contacted by any part of the sled. If so the latch will rotate in a clockwise direction thereby releasing the line from within the channel. For this reason, the opener post 64 is spaced from the pin 65 a sufficient distance to ensure that once the latch has rotated back to the first position, the free end 72a of the first spring does not contact the opener post. As shown in FIG. 6, the opener post is a flat plate which is mounted along the outer edge of the bar 36. In this manner, the opening means 66 will bypass the opener post when the latch has rotated to the second position.

FIGS. 8A-8F illustrate what is termed the opening sequence. As the sled advances along the length of the channel, each latch which transverses the channel is opened and closed as described above. If the sled advances towards a latch which is already in the second position (i.e. coaxial with the channel), that the operation of the sled is identical to that as illustrated above with respect to FIGS. 8C-8F. The sled will open or close the latch equally well whether the latch is in the first or second position or in any intermediate position.

Figure 9A:
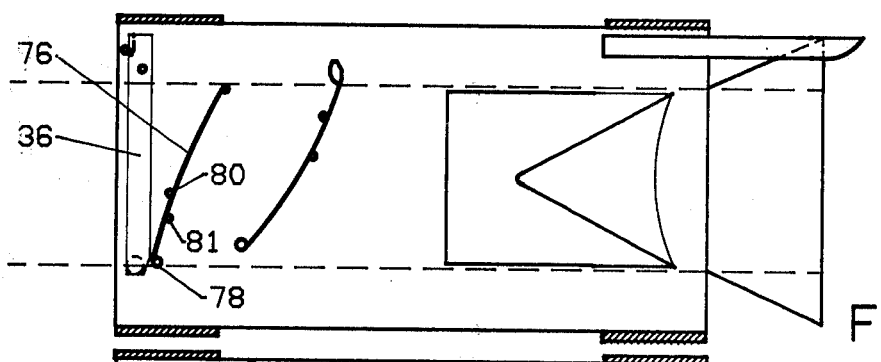
FIGS. 9A-9E are bottom plan views of the sled, looking upward toward the top of the sled, illustrating a release sequence wherein the sled is moving to the left as indicated by the arrow such that the latch, initially in a closed position transversing the channel, is pivoted thereby releasing the flexible line from within the channel.
Figure 9B:
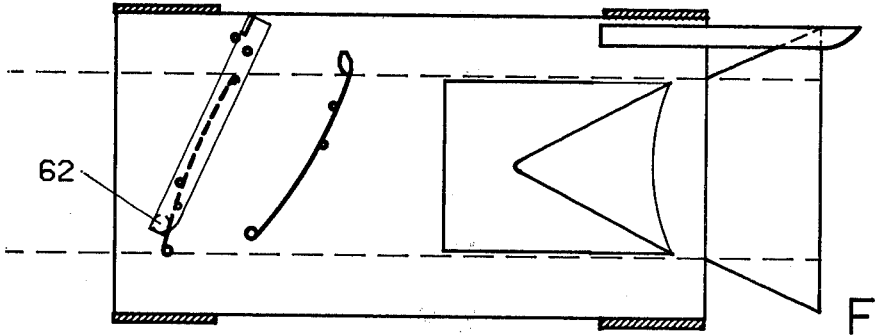
Figure 9C:
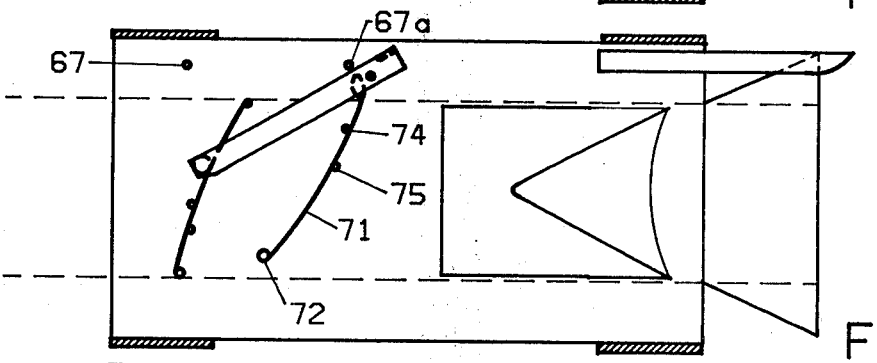
Figure 9D:
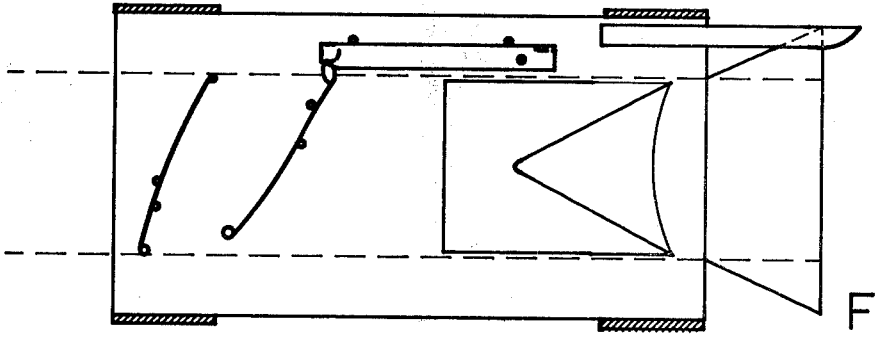
Figure 9E:
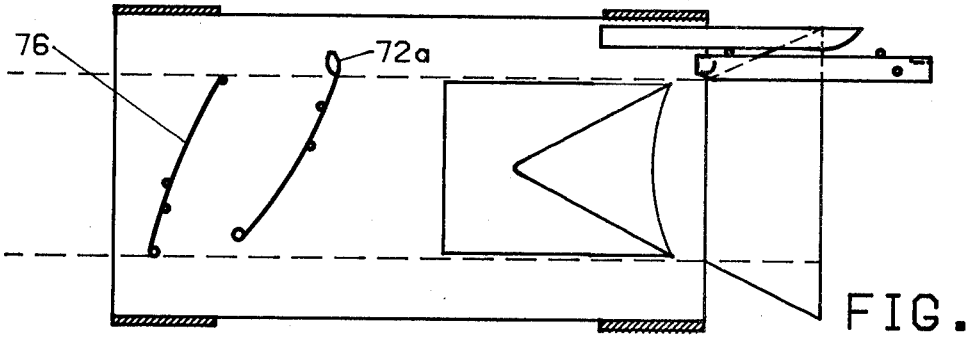

FIGS. 9A-9E illustrate the functional operation of the sled in a reverse direction as indicated by the arrow 84. This would occur when the sled is used to release a flexible line from a channel. As illustrated in FIG. 9A, the free end 78 of the second spring 76 initially contacts the closure post 62. Since there is no stopper to prevent the latch from rotating clockwise, the post 62 follows the contour of the second spring 76, as illustrated in FIG. 9B, pivoting about the pin 65. The stop pin 80 is short enough to permit the closure post to pass over yet long enough to contact the upper edge of the second spring. Once the latch clears the second spring, as illustrated in FIG. 9D, the latch is oriented in its second position with the bar 36 coaxially aligned with the channel and contacting the stopper 67. The closure post will strike the free end 72a of the first spring; however, the latch is prevented from rotation due to the stopper 67 and the spring is prevented from rotating about its secured end 72 due to the stop pin 75. With the latch in the second position, the sled passes over the latch without further contact (FIG. 9E). Alternatively, the first spring 71 may be removed if the sled is going to be used only to open the channel and release the flexible line since the first spring 71 rotates the latches from the second or open position to the first or closed position and the second spring 76 rotates the latches from the first position to the second position. In other words, with the first spring 71 removed, the sled system may still be used to open the channel (rotate latches to the second position) since the opening means 66 is used to rotate the latches to the second position when the sled is moving in a foward direction (see arrow 73 in FIG. 8A), and the second spring 76 is used to rotate the latches to the second position when the sled is moving in a reverse direction (see arrow 84 in FIG. 9E).

Therefore, the present invention is also capable of releasing the flexible line from the channel when the sled, advancing in a reverse direction, approaches a latch in either the first or second position. In FIGS. 9A-9E, the release of the flexible line with the sled advancing in a reverse direction and with the latch in a first position is illustrated.

Figure 10A:
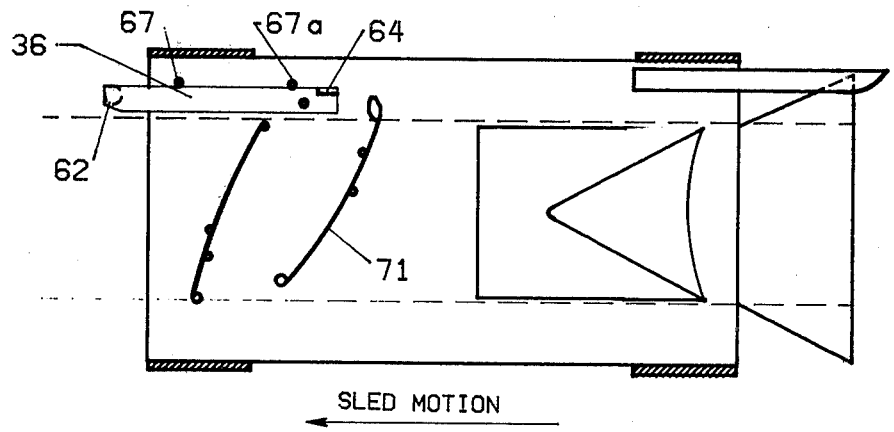
FIGS. 10A-10C are bottom plan views of the sled, looking upward toward the top of the sled, illustrating a release sequence wherein the sled is moving to the left as indicated by the arrow such that the latch, in an open position, is bypassed permitting removal of the line from the channel.
Figure 10B:
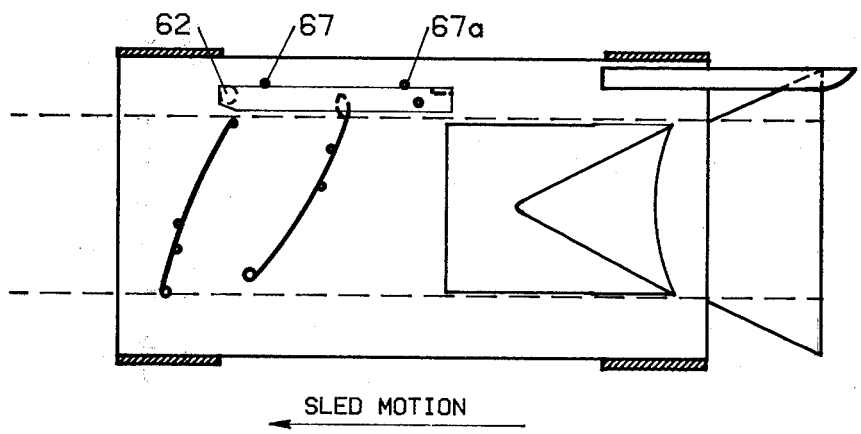
Figure 10C:
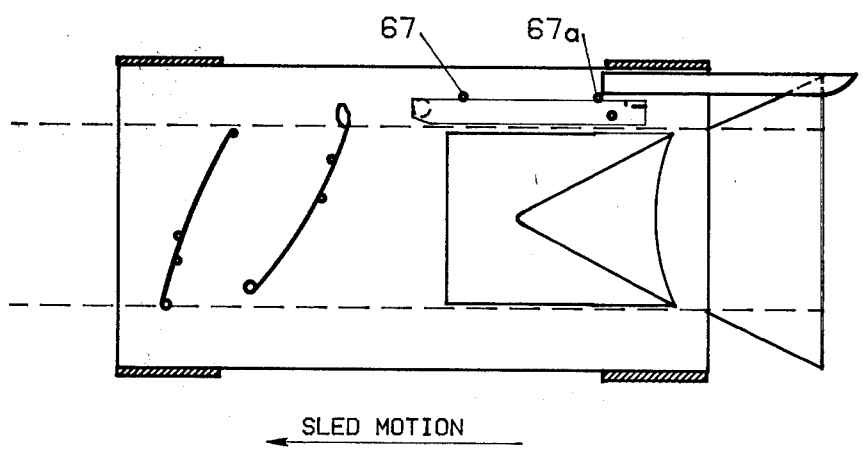

In FIGS. 10A-10C, the sled, advancing in a reverse direction, approaches an open latch. In FIG. 10A the opener post 64 bypasses the free end 72a of the first spring 71 due to its location on the outer edge of the bar member 36. As the sled advances, the closure post 62 strikes the free end of the first spring. As noted above, the first spring 71 is merely plucked yet prevented from rotating clockwise due to the stop pin 75.

Figure 11A:
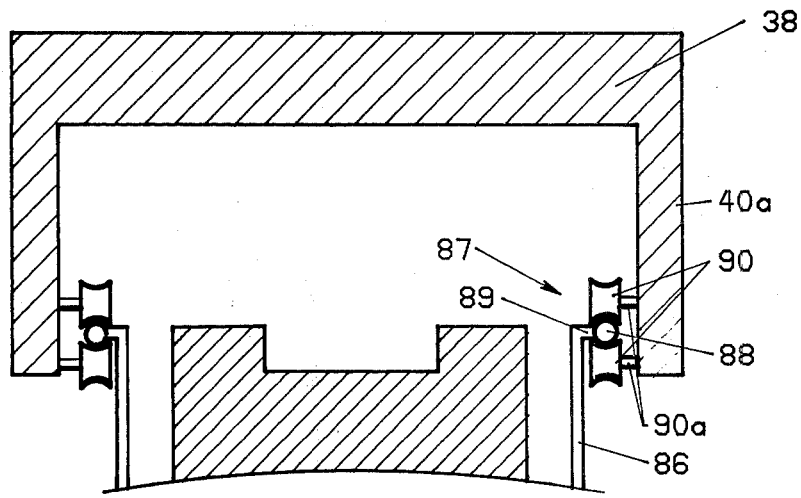
FIGS. 11A-11C illustrate various embodiments of track means for guiding the sled along the length of the channel.
Figure 11B:
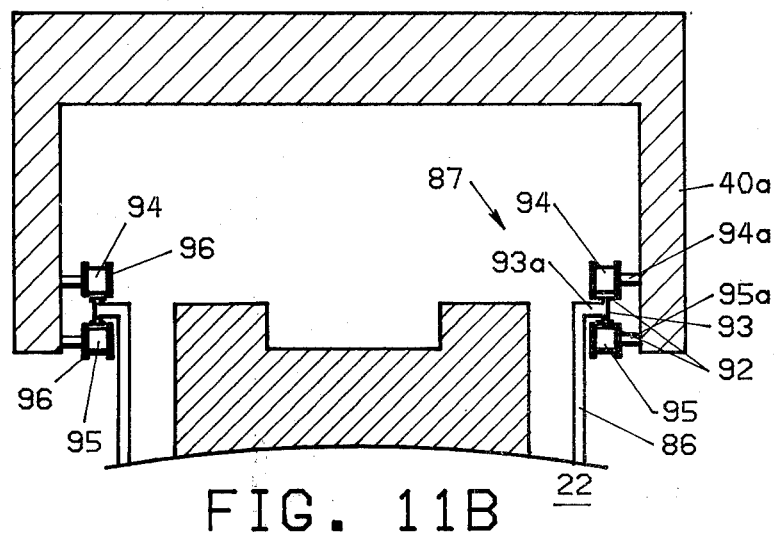
Figure 11C:
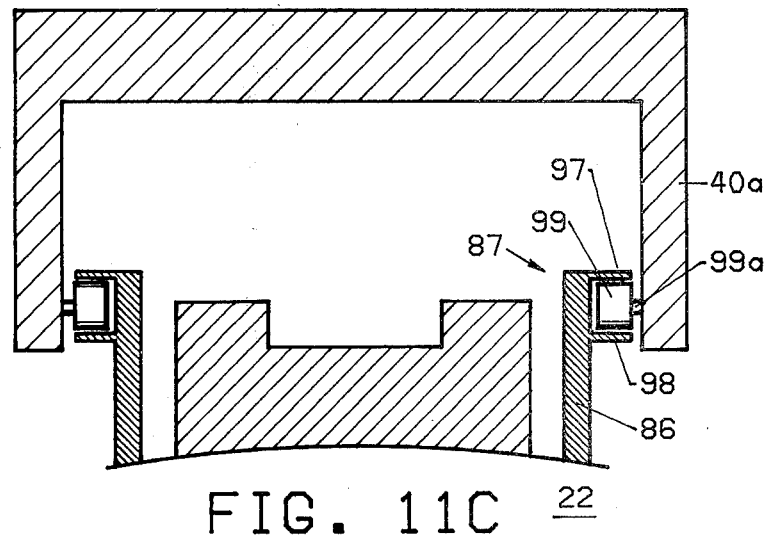

FIGS. 11A-11C illustrate various embodiments of the track means 40 (see FIG. 3A) used to support and guide the sled along the channel. Rather than employing a groove 42 within the elongated member, each embodiment utilizes a vertical plate 86 mounted directly to the support member 22. Each embodiment also includes various types of rail assemblies 87.

With respect to FIG. 11A, the rail includes a circular member 88 connected to a horizontal plate 89. The plate 89 is mounted at a right angle to the vertical plate 86. The housing includes two pairs of concave rollers 90, one pair per side, strategically mounted for placement above and below each circular member. Each roller rotates about an axle 90a which attached to the vertical plate 40a of the housing 38.

Referring to FIG. 11B, the rail assembly 87 comprises a pair of horizontal flanges 92 connected by a vertical web 93. The web 93 is connected to a tie-in plate 93a which, in turn, is mounted to the vertical plate 86. In this manner, the flanges are oriented at a right angle to the vertical member 86. The sled includes two pairs of upper and lower rollers 94, 95, one pair per side, which contact the flanges. Each roller includes a vertical lip 96 which extends past the flanges and thereby controls the lateral movement of the sled and an axle 94a, 95a which attaches to the vertical plate 40a.

FIG. 11C illustrates yet another embodiment of the track means wherein the vertical member 85 includes an upper and lower flanges 97 and 98 mounted at right angles to the vertical member 86. The sled would include a single roller 99 per side strategically spaced between the upper and lower flanges and supported by means of an axle 99a attached to the vertical plate 40a.

Obviously, various other embodiments of the track means are evident to one skilled in the art in view of this invention. However, it is intended that all such variations of alternate embodiments which logically extend from this disclosure be included within the present invention.

Figure 12:
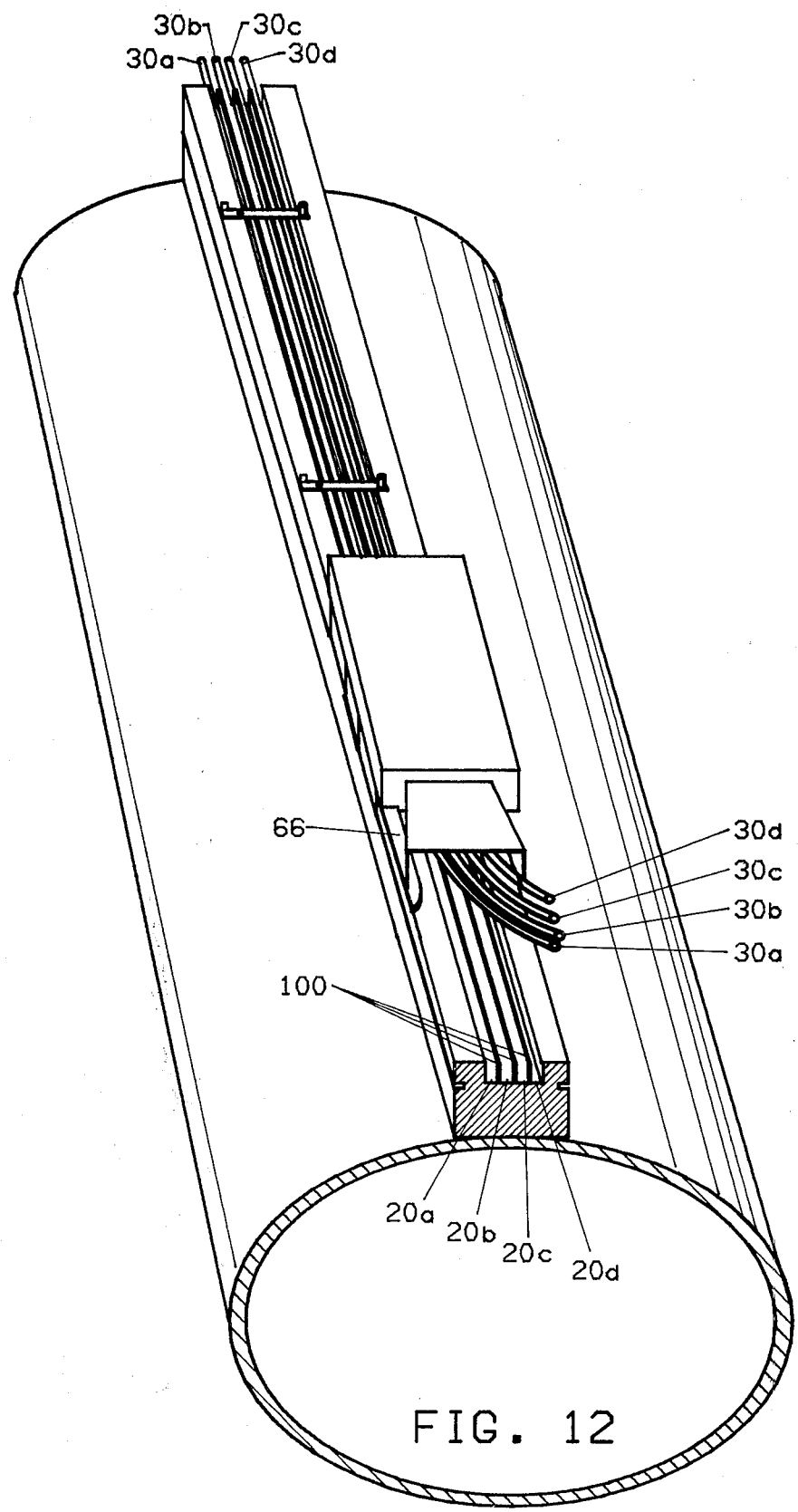
FIG. 12 illustrates an alternate embodiment of the present invention capable of simultaneously or sequentially installing or removing a plurality of flexible lines within the channel.

FIG. 12 is an alternate embodiment of the present invention wherein a plurality of parallel vertical plates 100 are located within the channel 20 defining a series of subchannels 20a–20d. In this manner, a plurality of flexible lines 30a–30d, may be sequentially or simultaneously installed or removed from the subchannels. The sled performs functionally the same as that described above with respect to the installation and removal of a single flexible line. The only significant difference from that described above is the length of the bar member 36 since the channel is wider to accomodate more lines.

Figure 13:
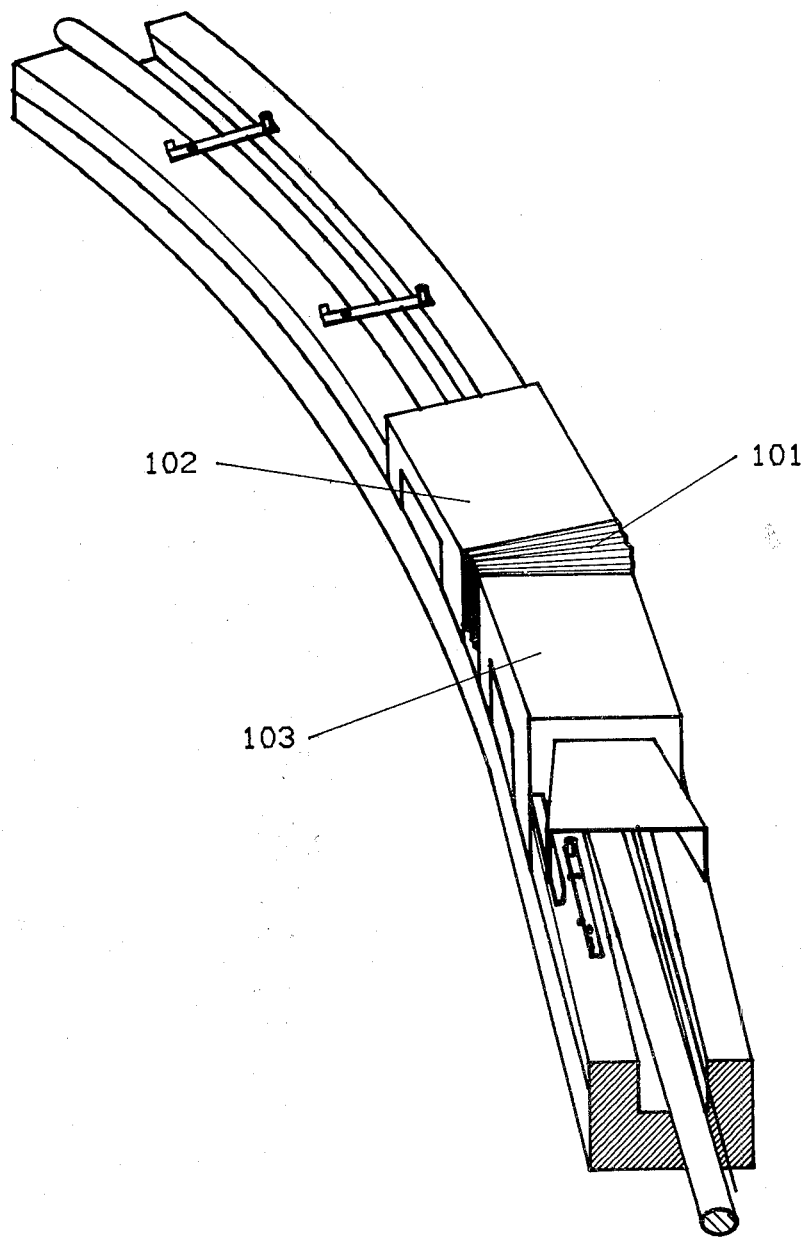
FIG. 13 is another alternate embodiment of the present invention illustrating an articulated sled for movement along a curved channel.

FIG. 13 is another alternate embodiment illustrating an articulated sled having a flexible joint 101 between a first 102 and second 103 housing. In this manner, one may practice the present invention along a curved channel wherein, for example, the first sled includes the opening means, funnel and spacing member while the second sled includes the first and second springs. By increasing the number of housings and allocating various functions (i.e. opening, installing, closing, etc.) to each housing, the minimum allowable radius of curvature for the channel may decrease.

Figure 14:
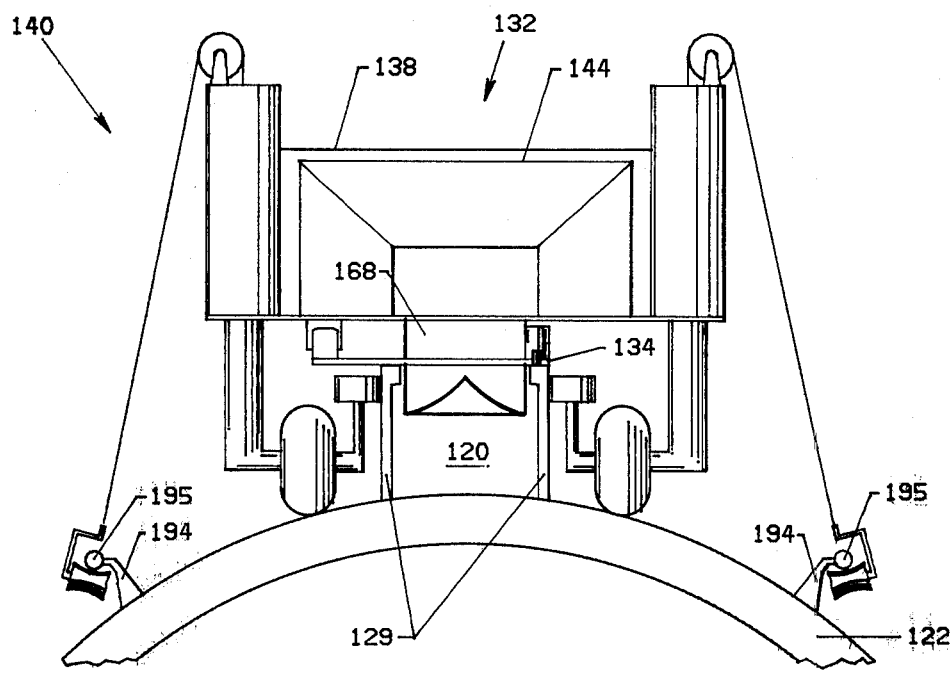
FIG. 14 is yet another alternate embodiment of the present invention illustrating the sled advancing above the channel along flexible cable track means.

FIG. 14 is yet another alternate embodiment of the present invention. Rather than employing a rigid track system to guide the sled above and along a channel formed on the support member of an offshore structure, this embodiment employs a track means 140 having a flexible cable 195 supported at predetermined locations along a support member 122. A sled 132 is supported above a channel 120 by the track means 140. The channel is formed on a support member 122 by two plates 129. The sled 132 includes a housing 138 and an alignment guide having a funnel 144 and a ramp 168. The sled 132 is identical in structure and function as that described above with respect to FIGS. 3, 6, 7A and 7B. The sled contacts a latch 134 which is pivotally connected to one of the plates 129. The latch 134 functions, with respect to the sled 132, similarly to that discussed above. The principal feature of this alternate embodiment is the track means 140.

Figure 15:
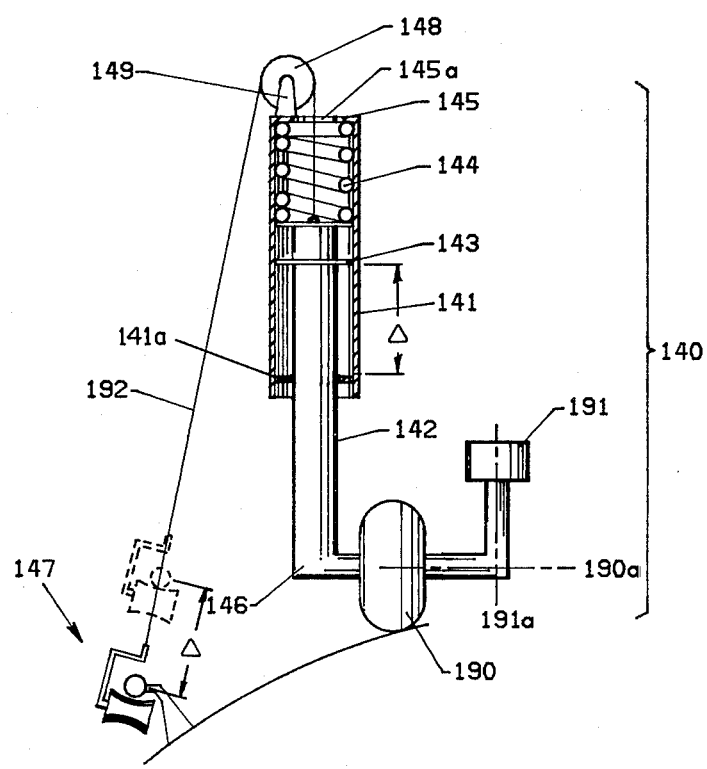
FIG. 15 is a detail of a track means employed on the alternate embodiment illustrated in FIG. 14.

Referring to FIG. 15, the track means 140 includes a cylinder 141 and strut 142. The cylinder is sealed off at its upper end by a plate 145 and open at its lower end. The strut 142 includes a sliding bearing head 143 which engages the inside surface of the cylinder 141. A coiled spring 144 is restrained within the upper end of the cylinder 141 between the upper plate 145 and the top surface of the bearing head 143. The cylinder 141 includes a stopper 141a which prevents the bearing head 143 from sliding out the lower end of the cylinder 141. The lower end of the strut 142 is bent at a right angle 146 to accommodate a roller 190 rotatably mounted thereto. The strut 142 continues through roller 190 and engages a secondary roller 191 mounted for rotational movement about an axis 191a perpendicular to an axis of rotation 190a of the roller 190. Obviously, many alternate combinations of rollers for attachment to strut 142 will be evident to one skilled in the art based on applicants' disclosure.

A compensating cable 192 connects to the top surface of the bearing head 143 and to a roller bracket 147. The cable 192 also passes around a sheave 148, which is mounted by means of plates 149 to the top end of the cylinder 141, and through an aperture 145a in the upper plate 145 connecting to the head 143.

Figure 16:
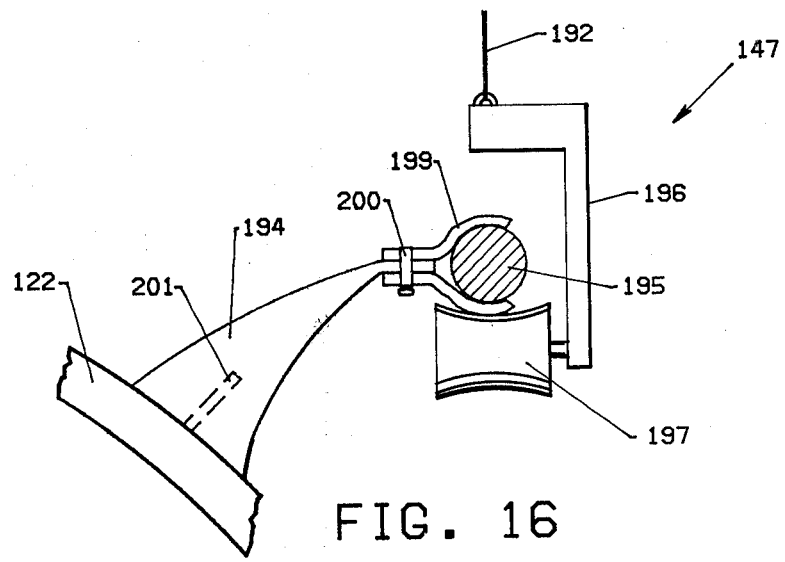
FIG. 16 is a detail of a bracket, employed on the alternate embodiment illustrated in FIG. 14, to hold the cable track means adjacent the support member.

FIG. 16 is a detail of the roller bracket 147 and a cable connector 194 which attaches the guide cable 195 to the support member 122. The bracket 147 includes an "L" shaped member 196 which is attached to the compensating cable 192. The bracket 147 also includes a contoured roller 197. The connector 194 engages the exterior surface of the cable 195 with a vise clamp arrangement 199. Frictional contact is maintained on the cable 195 by the connector 194 via a clamp 200.

Operationally, the sled 132 is restrained from lateral movement with respect to the channel 120 by means of the rollers 191 contacting the plates 129. The sled is held in contact with the surface of the member 122 by the coiled spring 144 biasing the strut 142 toward the member 122. In this manner, the cable 192 is always in tension since the deflection, $\Delta$ (see FIG. 17A), of the guide cable 195 with respect to support member 122 is limited.

Figure 17A:
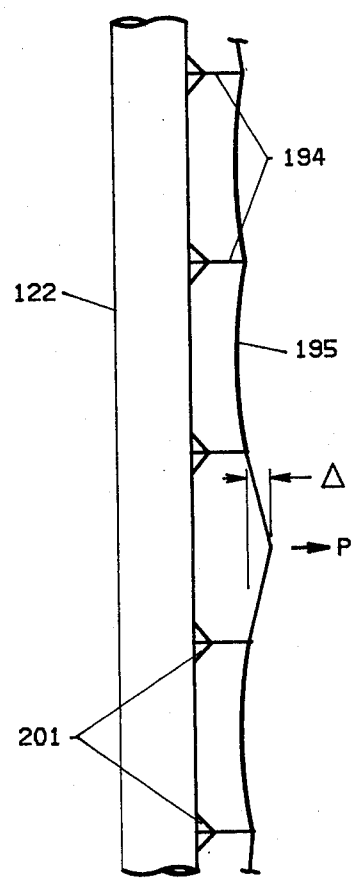
FIGS. 17A and 17B illustrate alternate types of bracket systems to hold the cable track means adjacent the support member.
Figure 17B:
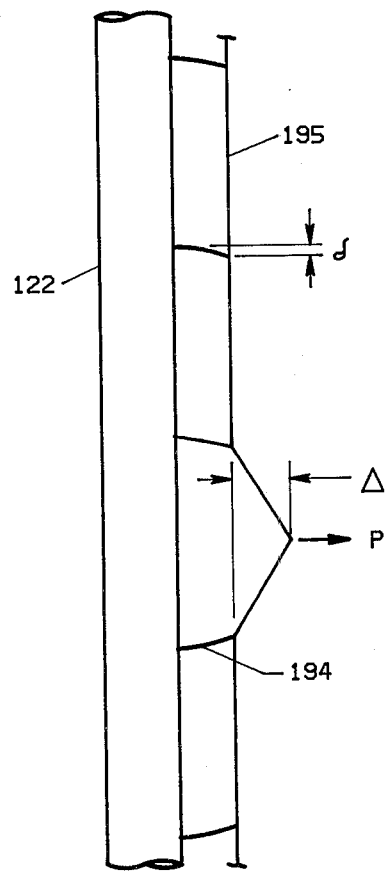

Referring to FIG. 17A and 17B, the amount of deflection, $\Delta$, permitted by the guide cable 195 with respect to the support member 122 is chosen to ensure that the slide bearing head 143 is not displaced downward far enough to contact the stopper 141a since the compensating feature of the system is then lost. In FIG. 15 the corresponding deflection, $\Delta$, as shown in FIGS. 17A and 17B is illustrated. To avoid excessive deflection, the slack in the guide cable 195 may be controlled or the guide cable may be pretensioned to reduce the amount of deflection. For example, with a one inch diameter guide cable having no slack and supported at 50 foot intervals along an elongated structure, the deflection, $\Delta$, may be limited to approximately 5 feet with no pretension and 0.2 feet with 1,000 pounds of pretension. In the first case (no pretension), the total tension on the cable, which includes the tension force due to the outward force resulting from the compensating cable 192 and movement of the sled 132 along the elongated structure, would be approximately 26,700 pounds; while in the second case (1,000 pounds of pretension), the total tension on the cable would be approximately 66,900 pounds. Using a one inch diameter 3×46 corrosion resistant steel rope (cable) having a breaking strength of approximately 100,600 pounds both conditions are satisfactory if an operator is satisfied with a safety factor of 1.50 (100,600/66,900). The operator may select a pretension, based on these parameters and dimensions, within a range of zero to 1,000 pounds. In selecting the specific pretension one would consider the amount of play permitted within the cylinder before the slide bearing head strikes the stopper 141a.

FIGS. 17A and 17B illustrate alternate configurations of cable connectors 194 to achieve the desired deflection, Δ. In FIG. 17A, the connectors 194 are designed to minimize their lateral deflection with respect to the support member due to the application of a perpendicular force "P" which represents the tension force exerted by the bracket 147 via the compensating cable 192 and spring 144. The connectors 194 may be designed to minimize their lateral deflection by inserting a brace 201 (illustrated by broken lines in FIG. 16) parallel to the direction of the tension force in the cable 195. Thus, the maximum permitted deflection, Δ, is a function solely of the slack and elongation of the cable between adjacent connectors.

On the other hand, in FIG. 17B the connectors 194 are capable of lateral deflection, δ, due to a reduction in the cross-sectional stiffness of each connector 194 (the braces 201 are eliminated). In this manner, the lateral deflection, δ, of the connectors permits a larger outward deflection, Δ, in FIG. 17B than in FIG. 17A. The operator may choose either system depending on the maximum allowed deflection, Δ, which can be tolerated.

The alternate embodiment disclosed in FIGS. 14–17B illustrates a track means which includes a flexible guide cable and a compensating system to adjust for the movement of the guide cable thereby ensuring that the sled is maintained immediately above the channel. In this manner, the sled may advance along the channel securing or releasing the flexible line 30.

In accordance with the teachings of the present invention, a method and apparatus for securing and releasing a flexible line within a pre-existing channel is disclosed. The present invention has particular application offshore wherein the flexible line is installed and removed in a pre-existing channel on a support member of an offshore structure. The sled is advanced, actively, along the length of the channel by means of the tow line or, passively, by means of gravity.

The foregoing invention has been described in terms of various embodiments. Modifications and alterations to these embodiments will be apparent to those skilled in the art in view of this disclosure. It is, therefore, the intention to cover all such equivalent modifications and variations which fall within the spirit and scope of this invention.

What is claimed is:

1. An apparatus for securing and releasing at least one flexible line to an elongated structure having a channel region, said apparatus comprising:
   a sled having a housing and capable of being slidably supported above the channel;
   at least one alignment guide attached to said housing to properly align and seat the line within the channel;
   first means supported from a first end of said housing adjacent said alignment guide for preparing the channel to receive the line immediately before said housing advances over the channel to align and seat the line within the channel;
   second means supported from a second end of said housing opposite said first end for closing the channel and securing the line within the channel as said housing advances; and
   means for advancing said housing relative to said channel in a first direction wherein said first means prepares the channel and said second means secures the line within the channel effectuating the installation of the line within the channel and in a second direction wherein said second means operates as an opening means releasing the line from within the channel.

2. The apparatus according to claim 1 wherein said apparatus further comprises a track means for maintaining said sled above the channel and preventing lateral deviation of said sled with respect to the channel.

3. The apparatus according to claim 2 wherein said track means comprises:
   an elongated member mounted on said elongated structure and having an outward surface and two vertical side faces, said channel being formed within said outward surface; and
   slide means for engaging said elongated member permitting the advancement of said sled along said channel.

4. The apparatus according to claim 2 wherein said apparatus further comprises a plurality of latches to secure the line within the channel, each latch having a bar member pivotally connected to one side of the channel at predetermined intervals along the length of the channel and responsive to said pivotal movement by contact with said first means pivoting said bar member from a first position wherein said bar member transverses the channel to a second position, said bar member being aligned coaxially with the channel permitting the installation of the line within the channel by said alignment guide, and thereafter said bar member being further responsive to contact with said second means wherein said bar member pivots from said second position back to said first position securing the line within the channel.

5. The apparatus according to claim 2 wherein said track means comprises:
   a flexible cable attached to and in spaced relationship with said elongated structure; and
   slide means for engaging said flexible cable permitting the advancement of said sled along said channel wherein said slide means is capable of compensating for slack in said flexible cable as said sled advances along said channel.

6. An apparatus for securing and releasing a flexible line to an elongated structure having an elongated member attached thereto wherein said elongated member includes a channel region formed therein, said apparatus comprising:
   a sled having a housing and capable of being slidably supported above the channel;
   first means supported from such housing for preparing the channel to receive the line;
   alignment guide supported from said housing for directing and seating the line within the channel after the channel has been prepared to receive the line by said first means;

second means supported from said housing for closing the channel after the line has been seated within the channel by said alignment guide; and a plurality of latches to secure the line within the channel after closure of the channel by said second means wherein said latches being pivotally connected to one side of the elongated member at predetermined intervals along the length of the channel and being responsive to said pivotal movement by contact with said first means pivoting said latch from a first position wherein said latch transverses the channel to a second position wherein said latch is aligned coaxially with the channel permitting placement of the line within the channel by said alignment guides, and thereafter, said latch being further responsive to contact with said second means wherein said latch pivots from said second position back to said first position securing the line within the channel.

7. An apparatus for securing and releasing a flexible line to an elongated structure having an elongated member attached thereto wherein said elongated member includes a channel region formed therein, said apparatus comprising:

a housing capable of being slidably supported above the channel, said housing having at least one alignment guide attached to a first end of said housing to properly align and seat the line within the channel;

first means for preparing the channel to receive the line immediately before said alignment guide positions the line within the channel;

second means for closing the channel after the line has been seated therein by said alignment guide; and means for advancing said housing relative to said channel in a first direction wherein said second means secures the line within the channel after said first means has prepared the channel and said alignment guide has aligned and seated the line within the channel thereby effecuating the installation of the line within the channel and in a second direction wherein said second means operates as an opening means releasing the line secured within the channel.

8. An apparatus for securing and releasing at least one flexible line to an elongated structure having a channel region, said apparatus comprising:

a plurality of latches pivotally attached to one side of said channel for releaseably securing the line within said channel;

a sled capable of being displaced along said channel and having a housing supported above said channel and an alignment guide mounted at one end of said housing to position said line directly above said channel;

first means for opening said channel to receive the line immediately before said housing advances over said channel and said alignment guide positions the line within said channel; and second means for closing said channel and releasably securing the line within said channel as said housing advances past by pivotally rotating said latches.

9. The apparatus according to claim 8 wherein said plurality of latches comprises:

a bar member pivotally connected to one side of said channel;

a closure post attached to one end of said bar member opposite said pivotal connection; and an opener post attached to said bar member opposite said closure post so that contact of said opener post with said opening means pivots said bar member from a first or closed position to a second or open position permitting said alignment guide to properly orient said line relative to said channel followed by said second means contacting said closure post and pivoting said bar member from said second position to said first position securing said line within said channel.

10. The apparatus according to claim 9 wherein said alignnment guide comprises a ramp having a grooved portion to centralize said line within said channel.

11. The apparatus according to claim 8 wherein said apparatus further comprises a plurality of parallel vertical plates mounted coaxially within said channel forming a series of subchannels permitting the installation of a plurality of flexible lines.

12. An apparatus for installing and removing at least one flexible line to an elongated structure having a channel with a curved section of a predetermined radius of curvature, said apparatus comprises:

an articulated sled having at least two housings and one flexible joint capable of being slidably supported over said channel wherein said flexible joint connects said two housings permitting said sled to articulate around and pass through said curved section of said channel without binding;

means for opening said channel to receive the line;

alignment guide for directing said line into said channel after said opening means has prepared said channel to receive said line and for seating said line within said channel wherein said alignment guide is supported from the first of said two housings; and means for closing said channel after said line has been seated therein by said alignment guide.

13. A system for securing a flexible line to an elongated structure comprising:

retaining means attached to said elongated structure having a plurality of latch means, which in an open position, being capable of receiving said line and, in a closed position, being capable of retaining said line against substantial lateral movement; and securing means attached to said elongated structure and adapted for longitudinal movement along said elongated structure having a guide means to properly align said line on said elongated structure, a first means to rotate said latch means to said open position, and a second means to rotate said latch means to said close position after said guide means has aligned said line on said elongated structure.

14. On an offshore structure having an upper and lower end and having a support member wherein said support member includes a channel formed thereon, a method for securing at least one flexible line within the channel using a remotely operated sled which comprises the steps of:

attaching the line temporarily to the upper end of the offshore structure such that the line is suspended adjacent the channel;

positioning said sled over the line and straddling said channel;

advancing said sled in a first direction relative to the channel wherein said sled prepares the channel to receive the line and simultaneously aligns the line over the channel; and seating and securing the line within the channel by means of said sled as said sled passes over the line following alignment of the line over the channel.

15. The method according to claim 14 wherein said method further includes the step of retrieving said sled after said sled has advanced to the end of the channel having secured the line within the channel.

16. The method according to claim 14 wherein the advancement of said sled in said first direction is from the upper end of said structure near the water surface to the lower end of said structure near the sea bed.

17. The method according to claim 14 wherein the advancement of said sled in said first direction is from the lower end of said structure near the sea bed to the upper end of said structure near the water surface.

18. The method according to claims 14 or 15 wherein the line is removable from the channel wherein said method compries the further step of advancing said sled relative to the channel in a second direction opposite said first direction so as to release the line from within the channel.

19. On an offshore structure having an upper and lower end and having an elongated member attached to a support member of said structure wherein said elongated member includes a channel formed therein, a method for securing at least one flexible line within the channel using a remotely operated sled which comprises the steps of:

attaching the line to the upper end of the structure such that the line hangs adjacent to the channel;

preparing the channel to receive the line at the forward end of said sled by advancing said sled along the channel opening the channel to the line;

aligning the line over the channel by means of said sled while said sled simultaneously prepares the channel to receive subsequent portions of the line; and seating and securing the line within the channel by means of said sled immediately after aligning the line over the channel.

* * * * *